United States Patent Office 2,703,557
Patented Mar. 8, 1955

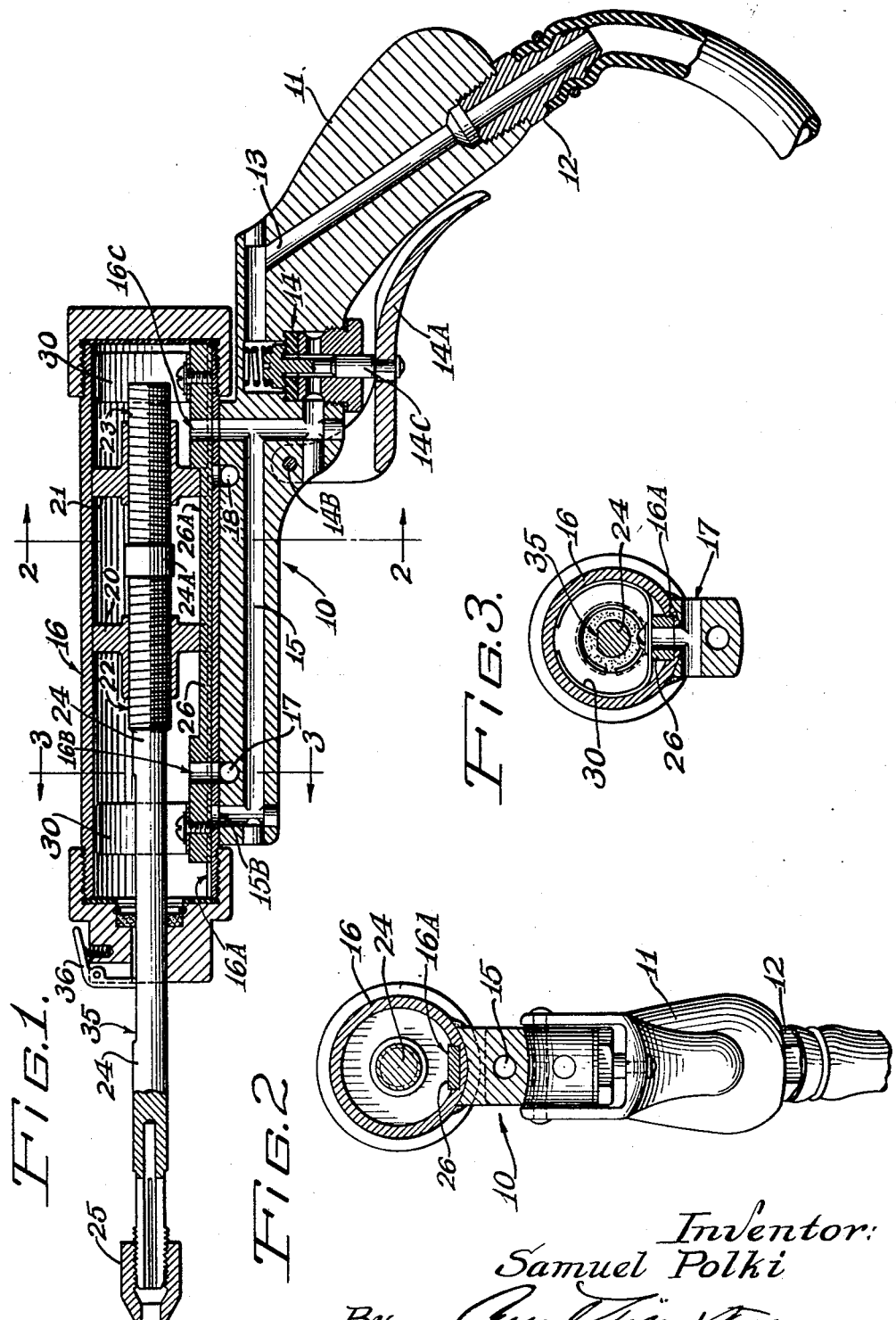

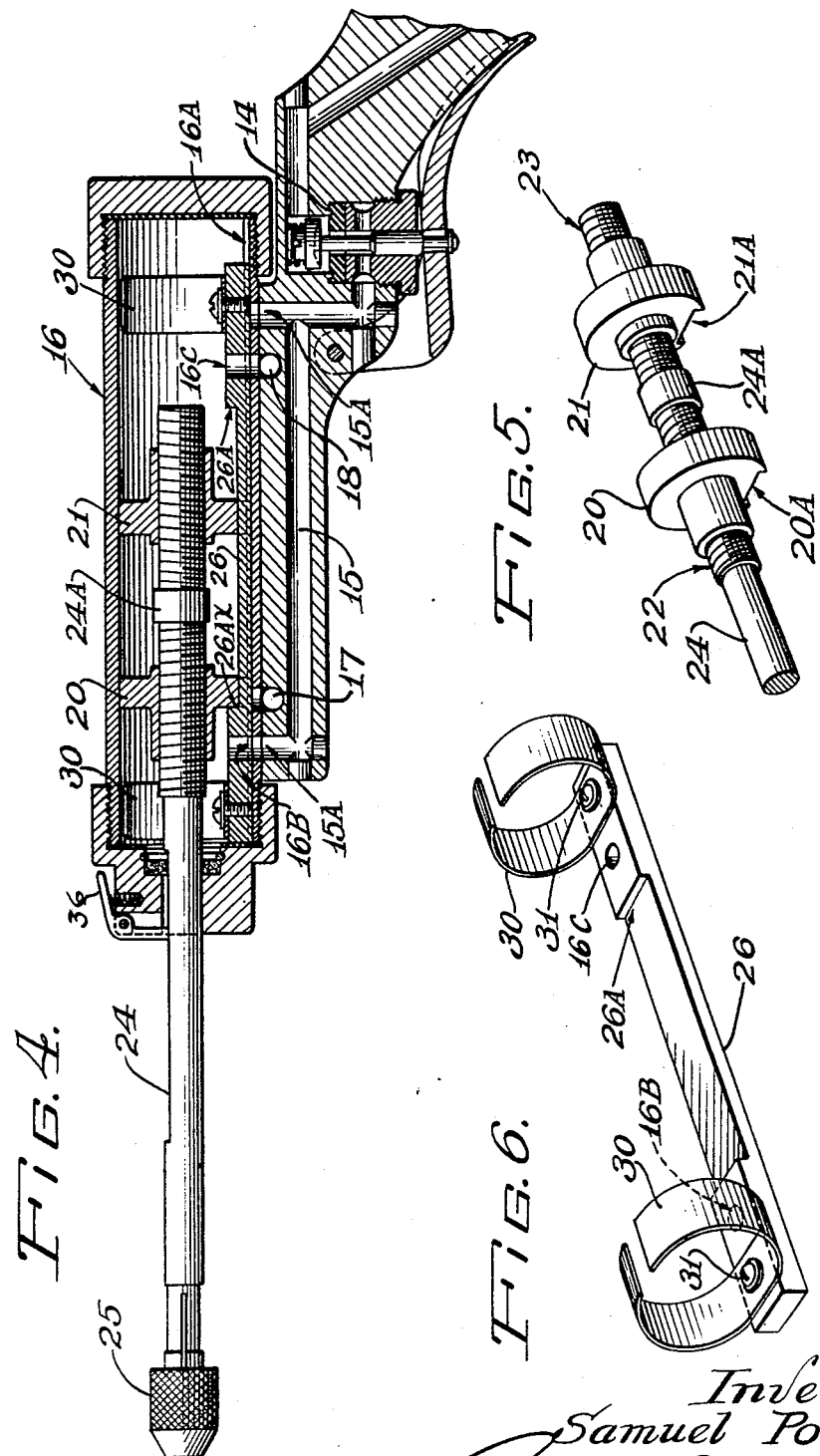

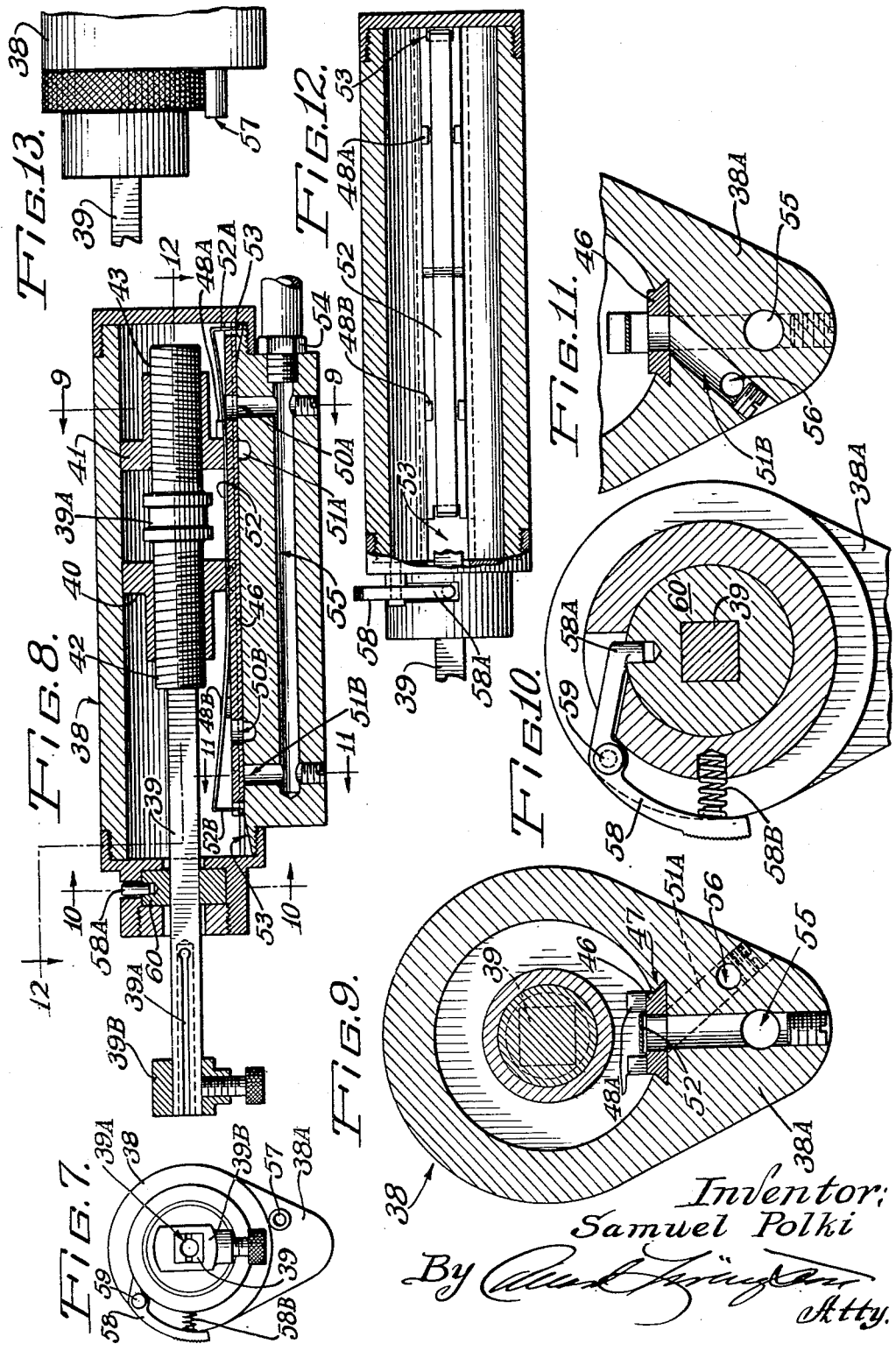

2,703,557

PNEUMATIC HAND TOOL

Samuel Polki, Chicago, Ill.

Application February 5, 1951, Serial No. 209,455

6 Claims. (Cl. 121—3)

The present disclosure pertains to pneumatically powered tools—particularly hand tools of the type including a reciprocating tool carrier.

The principal object is the provision of a tool of the character described in which the reciprocating tool carrier is pneumatically driven in both phases of its stroke.

Another object is to provide a tool of the class described having no spring loading to move the tool carrier in part of its stroke.

Another object is the provision, in a tool of the class described, of an adjustable tool carrier or holder, the stroke of which is adjustable by rotative displacement of the reciprocatory element thereof to effect a corresponding adjustment of the piston means therefor.

Another object is the provision of a reversing valve structure cooperable with a pair of mutually adjustable piston elements in an adjustable stroke tool, such as hereinabove characterized.

A further object is the provision of a pneumatic hand tool having a pair of pistons working in a common cylinder to reciprocate a piston rod and chuck carrier which is reversely threaded into the pistons for convergence or divergence of the latter to adjust the stroke thereof, together with a reversing valve member reciprocable by the pistons in all adjustments thereof.

Additional objects are the provision, in tools of the class described, of a double-acting piston structure which is adjustable by manipulation of the tool holder, which has a cylinder adaptable to hand holding, which has a compressed air vent directed at the work, and which is capable of fast and slow working speeds.

Still further objects relate to the provision in a hand tool of a cylinder body having a periform external contour including a wedge-like radial projection which is peculiarly adapted to fit into the grasp of one hand, and in which certain radial and longitudinal duct formations are economically and efficiently contrived to direct compression and exhaust air into and out of a cylinder for reversely displacing a piston structure which is entirely reciprocated by air, as distinguished from the spring-loaded types of pneumatic engine.

Additional objects and aspects of novelty and utility relate to details of the construction and operation of the valve structure, the stroke-adjusting means, and other parts of the embodiment described hereinafter in view of the annexed drawings, in which:

Fig. 1 is a vertical, longitudinal section through the improved pneumatic tool;

Fig. 2 is a transverse section along lines 2—2 of Fig. 1;

Fig. 3 is a transverse sectional detail along lines 3—3 of Fig. 1;

Fig. 4 is a fragmentary longitudinal section like Fig. 1, but showing the piston means at the end of its forward stroke;

Fig. 5 is a perspective detail of the piston assembly;

Fig. 6 is a perspective view of the valve traveler and brake;

Fig. 7 is an endwise elevation, to reduced scale, of the hand-held cylinder in a modified construction;

Fig. 8 is a vertical longitudinal section through the modified cylinder structure of Fig. 7;

Fig. 9 is a cross section, to enlarged scale, taken along lines 9—9 of Fig. 8;

Fig. 10 is a cross-sectional detail of the latch means, taken along lines 10—10 of Fig. 8;

Fig. 11 is a fragmentary cross-sectional detail taken along lines 11—11 of Fig. 8;

Fig. 12 is a horizontal sectional detail looking down upon lines 12—12 of Fig. 8;

Fig. 13 is a fragmentary side-elevational detail of the head of the tool of Fig. 7, to enlarged scale.

Referring to Fig. 1, the tool includes a stock portion 10 having a pistol grip 11 with a compressed-air inlet nipple or connection 12 communicating via duct 13 past valve 14 into duct 15 to feed ports 15A and 15B leading into cylinder 16.

Within the cylinder 16 (Fig. 1) are two pistons 20 and 21, respectively threaded upon reverse threading 22, 23 on the tool carrier or piston rod 24, such that said pistons may be converged or drawn toward each other and the stop shoulder 24A, or diverged away from each other and said shoulder, responsive to appropriate clockwise or counter-clockwise rotation of the piston rod 24, in that the stroke of the piston means may be regulated.

Means for reversing the air feed to said piston means, includes a valve traveler 26 of the form shown in Fig. 4, which reciprocates slidably in an internal groove 16A (Figs. 2 and 3) in the cylinder.

At its opposite ends (Figs. 1 and 3) the traveler has ports 16B and 16C which can be resistered respectively with air discharge ports 17 and 18 from the feeding duct 15, depending upon the position of the traveler. In Fig. 1, ports 16C and 18 are registered when the piston assembly is at the end of its rearward or back stroke.

In the latter condition of the ports, the piston assembly is ready to be driven forward by air issuing from port 16C when control valve 14 is opened, as by pressure on the handle-grip lever 14A, which is pivoted on the stock as at 14B to press the valve tappet 14C and open this valve responsive to a squeeze upon the hand grip. At this time (Fig. 1) it will be observed that port 16B is in register with exhaust port 17, through the stock.

In the condition of the ports, as depicted in Fig. 4, the piston assembly, including pistons 20 and 21 and the valve traveler 26, are at the end of the forward stroke, so that port 16C registers with exhaust port 18, and port 15A is closed by the traveler, while the forward ports 15B and 16B are registered and exhaust port 17 is closed. In this figure, also, control valve 14 is shown open.

As viewed particularly in Figs. 4, 5, and 6, the valve traveler 26 is keyed to the piston means by the provision in each of the pistons 20 and 21 of keyways or notches 20A and 21A, which interfit with the reduced track or guide portion 26A of the traveler. By this means, the two pistons are prevented from rotating relative to the cylinder, since the traveler is keyed in its slide track 16A, and as a result, the piston rod 24 may be rotated reversely to converge and diverge the pistons as aforesaid, depending upon which way the piston rod is turned.

Means for releasably holding the valve traveler in its porting positions includes (Figs. 4 and 6) a brake in the form of a presser ring 30, mounted as at 31 at each end of the traveler, said pressers being of suitable Phosphor bronze spring material and fitting slidably but tightly with the cylinder wall.

By the aforesaid means, the porting valve (i. e. member 26) is held yieldably at one or the other of its limits of travel with sufficient force to permit the two pistons to work back and forth on the track 26A.

Reversing travel of the valve traveler is effected by engagement of the piston ports adjacent key slots 20A and 21A against the ends of the trackway 26A, as at 26AX (Fig. 4).

The presser-brake means renders the traveler sufficiently yieldable to make the piston impacts harmless in reversing operations; and the stoppages of the piston assembly at the end of each stroke tend to be cushioned by the reverse admissions of air.

A suitable tool such as a file (not shown) or the like may be secured in the holder or chuck 25, and reciprocated with adjustable stroke and speed, the former by adjustment of the rod 24, as by releasing the catch 36 (Fig. 1) so that the rod may be manually turned for the purpose and in the manner heretofore described; and the latter, by regulation of the pressure of the air supplied to the tool, as at the inlet connection 12; and also, at the will of the operator as by the amount of opening of control valve 14 by squeezing on lever 14A.

By reason of elimination of spring loading and having an adjustable piston with reversing valve means contrived as disclosed, the tool makes possible a uniform power stroke in both phases of reciprocation, as well as a stroke which is adjustable not only in length but in power also.

The working stroke is limited at maximum by the stop shoulder 24A with the two pistons backed up thereto; and at minimum by the length of the track 26A with the two pistons separated and respectively engaging an end of the track.

In order to prevent unintended rotation of the chuck or piston rod, there is provided a slight flat 35 on the rod (Figs. 3 and 4) upon which rides a detent 36, adapted to be released by pressure of the finger when it is desired to turn the rod for stroke adjustment.

In a modified construction shown in Fig. 7 the cylinder 38 has a cross section (Fig. 9 also) which is periform, there being a triangular wedge 38A projecting radially along one side of the cylinder affording a shape especially effective for hand holding while working the tool.

As seen in Fig. 8, the mechanism of the hand-fitting tool is essentially like that of the type of Fig. 1 in that it has a piston and tool-carrying rod 39A provided with adjoining reversely threaded sections 42, 43, separated by an intervening stop shoulder 44A, and a pair of threadably adjustable piston elements 40 and 41 thereon.

A valve or porting slider 46 (Fig. 8) slides in an undercut keyway 47 (Fig. 9) in the cylinder wall, and has opposite marginal stops 48A, 48B against which the pistons alternately strike in approaching the ends of their strokes to shift the slide and register ports 50A, 50B, and close ports 51A, 51B, in driving the pistons, which, like the pistons in the device of Fig. 1, are keyed to the slider so as to be held against rotation.

Friction rings 30 are preferably not employed in the modified device of Fig. 8; instead, an elongated flat spring 52 having its opposite ends 52A, 52B offset to ride on downwardly pitched faces 53 at opposite ends of the cylinder wall.

Spring 52, in addition to serving as a brake, acts as a carry-over means, the latter function being especially useful when the tool is working at slow speed, to assure that the pistons will carry to the ends of their strokes, by reason of the action of the offsets 52A, 52B in creeping on the pitched faces 53 with the aid of momentum; in this sense spring means 52—52A—52B—53 constitute a brake and creeper or carry-over means.

The air inlet line is connected to a nipple 54 (Fig. 8), and the compressed air is delivered via duct 55 in the triangular extension 38A to the inlet ports 50A, 51B; while the exhaust ducts 51A, 50B (as in Figs. 9 and 11) communicate with exhaust duct 56, also situated in the triangular extension 38A, but at one side of the inlet duct 55, so as to emerge at the head of the tool in a blower-exhaust port 57, in order to blow filings and chips from the work.

It will be observed in Figs. 9 and 10 that the piston rod 39 has a square section; and as seen in Fig. 10 particularly there is a detent lever 58 urged by spring 58B pivoted on the head cap, as at 59, with a detent nose 58A engaging in a depression in the head packing gland 60 on piston rod 39 to keep the latter from rotating during reciprocation, so that the stroke adjustment will not change.

By releasing the detent the projecting port of the piston rod may be grasped and turned to thread the two piston elements 40, 41 toward or away from each other to change the working stroke, as in the case of the device of Fig. 1; and in other general respects the two embodiments described operate substantially in the same manner.

The chuck of the device, as shown in Figs. 7 and 8, is modified in that there is provided in the outer end of the piston rod 39 an elongated, split axial slot 39A to receive the tail of a tool, such as a file or the like, and a sliding screw clamp 39B is positionable along the chuck slot to hold the tool removably in position.

The tool of Fig. 8 is simplified by omission of the pistol grip and trigger valve, and is intended for hand-holding applications where the pistol grip type is not suitable. The air supply tube is provided with any suitable type of valve cock (not shown) to control the air flow.

The several spring means 30 (Fig. 6) or 52 (Fig. 8) are primarily friction means for maintaining the valves in proper position between reverse strokes, and the spring action (including the creeper or carry-over function of the modified spring means 52) is not considered spring-loading in the sense in which this expression is generally used to convey that (as in other types of pneumatic tools) the working or return stroke is effected by some spring means; in the device disclosed both strokes are power strokes and their is no spring loading.

I claim:

1. In a pneumatic hand tool, a cylinder, a pair of piston members reciprocable in said cylinder, a piston rod threadedly engaging said piston members with reverse threading such that said pistons may be diverged or converged responsive to corresponding rotations of said piston rod, means in said cylinder preventing rotative movement of said piston members, a valve member reciprocated by said piston members, means including a pair of inlet ports connecting a source of compressed air into opposite end regions of said cylinder, an air exhaust port in each end region of said cylinder, said valve member being moved relative to said ports responsive to displacements of said piston members by compressed air to open and close said ports in a predetermined order and effect reciprocable pneumatic drive of said piston members and piston rod, the stroke of the latter being determined by the relative positioning of said piston members threadedly thereon, as aforesaid.

2. In a pneumatic tool, a cylinder including an air-pressure duct for connection to a supply of compressed air, and an exhaust duct, a pair of pistons coaxially reciprocable in said cylinder, a piston rod common to said pistons and operatively coupled thereto respectively by screw threading of mutually reverse pitch such that reverse rotations of the rod will converge or diverge the pistons to change the stroke, a valve member slidably keyed in said cylinder for reciprocation by said pistons to control positions, inlet and exhaust ports respectively connecting with said pressure and exhaust ducts at opposite end regions of the cylinder for admission and exhaust of air to drive said pistons oppositely in reciprocating action, spring brake means for yieldingly holding said valve member in said control positions, latch means including a releasable detent for locking said piston rod against rotation, and chuck means carried by said piston rod.

3. A tool according to claim 2 in which said brake means is in the form of an arcuate yoke spring carried at opposite ends of said valve member and frictionally riding against the inner wall of said cylinder.

4. A tool according to claim 2 in which said brake means is in the form of an elongated flat spring carried by said valve member and has opposite end portions offset for frictional engagement with inner wall surfaces of said piston.

5. In a pneumatic hand tool, a cylinder body, an elongated cylinder bore in said body, an extendable piston structure reciprocable in said bore, said structure being extendable and retractable in the direction of movement in said bore, and including opposite leading and trailing piston sections adjustable toward and away from each other, a piston rod movable concentrically of said bore and piston structure sections and having threaded adjusting connection with both sections of the latter, tool holding means carried by said rod, and relatively reverse thread means on both of said piston-structure sections coacting with correspondingly reverse thread means on said piston rod for extending or retracting said piston structure sections by rotation of said rod relative thereto to modify the stroke thereof, together with manually releasable means accessible exteriorly of said cylinder body and normally locking said piston rod against threading movement.

6. In a pneumatic hand tool adapted to be held in the grasp of one hand, an elongated body of periform cross-section and having a large parti-cylindrical upper section containing a piston cylinder with a pendant wedge-shaped lower section, an air-pressure duct for connection to a supply of compressed air, and an exhaust duct, said ducts being located in said wedge-shaped section, a pair of pistons coaxially reciprocable in said cylinder, a piston rod common to said pistons and operatively coupled thereto respectively by screw threading of mutually reverse pitch such that reverse rotations of the rod will converge or diverge the pistons to change the stroke, a valve member slidably keyed in said cylinder for reciprocation by said pistons to control positions, inlet and exhaust ports in said wedge section respectively connecting with said pressure and exhaust ducts at opposite end regions of the cylinder for admission and exhaust of air to drive said pistons oppositely in reciprocating action, latch means including a releasable detent for locking said piston rod against rotation, and chuck means carried by said piston rod.

References Cited in the file of this patent

UNITED STATES PATENTS

| Number | Name | Date |
|---|---|---|
| 111,624 | Fogarty | Feb. 7, 1871 |
| 168,314 | Allen | Oct. 5, 1875 |
| 510,155 | Von Buhler | Dec. 5, 1893 |
| 671,970 | Koch | Apr. 16, 1901 |
| 714,269 | Walton | Nov. 25, 1902 |
| 984,112 | Schumacher | Feb. 14, 1911 |
| 1,177,363 | Smith | Mar. 28, 1916 |
| 1,650,877 | McMahon | Nov. 29, 1927 |
| 2,196,224 | Morgan | Apr. 9, 1940 |
| 2,555,018 | Von Seggern | May 29, 1951 |